US008600653B2

(12) United States Patent
Elkaim et al.

(10) Patent No.: US 8,600,653 B2
(45) Date of Patent: Dec. 3, 2013

(54) ELECTRONIC MONITORING SYSTEM ENABLING THE CALCULATION OF ACTUAL FUEL CONSUMPTION AND $CO_2$ EMISSIONS FOR A MOVING, STOPPED OR OPERATIONAL AIRCRAFT, WITH OR WITHOUT FUEL THEFT EXCLUSION

(75) Inventors: Eric Elkaim, Marseilles (FR); Sylvain Heinry, Paris (FR)

(73) Assignee: ADD, Marseille (FR)

( * ) Notice: Subject to any disclaimer, the term of this patent is extended or adjusted under 35 U.S.C. 154(b) by 0 days.

(21) Appl. No.: 13/503,069

(22) PCT Filed: Oct. 20, 2010

(86) PCT No.: PCT/FR2010/052238
§ 371 (c)(1), (2), (4) Date: May 21, 2012

(87) PCT Pub. No.: WO2011/048333
PCT Pub. Date: Apr. 28, 2011

(65) Prior Publication Data

US 2012/0232777 A1 Sep. 13, 2012

(30) Foreign Application Priority Data

Oct. 21, 2009 (FR) .................................... 09 57388

(51) Int. Cl.
*G06F 19/00* (2011.01)

(52) U.S. Cl.
USPC .......................................................... 701/123

(58) Field of Classification Search
USPC .......................................................... 701/123
See application file for complete search history.

(56) References Cited

U.S. PATENT DOCUMENTS

| | | | |
|---|---|---|---|
| 4,344,136 | A | 8/1982 | Panik |
| 6,240,365 | B1 | 5/2001 | Bunn |
| 2001/0018628 | A1 | 8/2001 | Jenkins |

FOREIGN PATENT DOCUMENTS

| | | | |
|---|---|---|---|
| FR | 2 871 741 | A1 | 12/2005 |
| FR | 2 884 951 | A1 | 10/2006 |
| FR | 2 902 219 | A | 12/2007 |
| GB | 2 338 308 | A | 12/1999 |
| WO | 2004/007344 | A1 | 1/2004 |
| WO | 2006/011054 | A2 | 2/2006 |
| WO | 2008/146307 | A2 | 12/2008 |

*Primary Examiner* — Hussein A. Elchanti
(74) *Attorney, Agent, or Firm* — Lucas & Mercanti, LLP

(57) ABSTRACT

The invention relates to an electronic monitoring system enabling real fuel consumption and $CO_2$ emissions to be calculated for a machine in motion, stopped, or working, with optional exclusion of thefts of fuel, the system comprising both a sentinel onboard a machine that itself comprises at least an engine, a tank, an electrical power supply circuit, and also a non-mobile surveillance tool to which the onboard sentinel is suitable for being connected by wire or wireless means.

18 Claims, 5 Drawing Sheets

Ignition: ON

Engine: running

| Record | Date | Time | V1 | V2 | V3 | State 1 | State 2 | V | Loc1 | Loc2 |
|---|---|---|---|---|---|---|---|---|---|---|
| 2102, | 06/09/2009, | 21:02:06, | 385.7, | 426.3, | 0.0, | 00000000, | 00000000, | 0, | 2236.586,N | 10143.321,W |
| 2103, | 06/09/2009, | 21:03:36, | 385.7, | 426.3, | 0.0, | 00000000, | 00000000, | 0, | 2236.586,N | 10143.321,W |
| 2104, | 06/09/2009, | 21:05:06, | 385.7, | 426.3, | 0.0, | 00000000, | 00000000, | 0, | 2236.586,N | 10143.321,W |
| 2105, | 06/09/2009, | 21:06:36, | 385.7, | 426.3, | 0.0, | 00000000, | 00000000, | 0, | 2236.586,N | 10143.321,W |
| 2106, | 06/09/2009, | 21:08:06, | 385.7, | 417.3, | 0.0, | 00010000, | 00000000, | 10, | 2236.586,N | 10143.221,W |
| 2107, | 06/09/2009, | 21:09:36, | 385.4, | 417.6, | 0.0, | 00010000, | 00000000, | 5, | 2236.586,N | 10143.121,W |
| 2108, | 06/09/2009, | 21:11:06, | 385.0, | 417.6, | 0.0, | 00010000, | 00000000, | 6, | 2236.486,N | 10142.921,W |
| 2109, | 06/09/2009, | 21:12:36, | 385.4, | 414.5, | 0.0, | 00010000, | 00000000, | 33, | 2236.186,N | 10142.321,W |
| 2110, | 06/09/2009, | 21:14:06, | 383.7, | 414.3, | 0.0, | 00010000, | 00000000, | 41, | 2235.786,N | 10141.421,W |
| 2111, | 06/09/2009, | 21:15:36, | 382.5, | 413.0, | 0.0, | 00010000, | 00000000, | 27, | 2235.386,N | 10140.521,W |
| 2112, | 06/09/2009, | 21:17:06, | 381.7, | 411.5, | 0.0, | 00010000, | 00000000, | 26, | 2235.403,N | 10139.749,W |
| 2113, | 06/09/2009, | 21:18:36, | 381.2, | 412.4, | 0.0, | 00010000, | 00000000, | 23, | 2235.003,N | 10139.549,W |
| 2114, | 06/09/2009, | 21:20:06, | 375.6, | 408.9, | 0.0, | 00010000, | 00000000, | 46, | 2234.467,N | 10138.905,W |
| 2115, | 06/09/2009, | 21:21:36, | 370.9, | 402.3, | 0.0, | 00010000, | 00000000, | 52, | 2233.867,N | 10138.105,W |
| 2116, | 06/09/2009, | 21:23:06, | 362.1, | 388.7, | 0.0, | 00010000, | 00000000, | 47, | 2233.015,N | 10136.972,W |
| 2117, | 06/09/2009, | 21:24:36, | 362.4, | 389,0. | 0,0 | 00010000, | 00000000, | 44, | 2231.921,N | 10136.495,W |
| 2118, | 06/09/2009, | 21:26:07, | 361.3, | 388.8, | 0.0, | 00010000, | 00000000, | 54, | 2231.097,N | 10135.405,W |
| 2119, | 06/09/2009, | 21:27:37, | 361.2, | 387.5, | 0.0, | 00010000, | 00000000, | 49, | 2230.258,N | 10134.283,W |

Vehicle in motion
Max consumption flow: 100
Max top-up flow: 6500

Parked, engine running
Max consumption flow: 50
Max top-up flow: 6500

Parked, engine stopped
Max consumption flow: 20
Max top-up flow: 6500

FIG.3A

| Site | License plate | Date/time | Volume | Driver |
|---|---|---|---|---|
| Marseille | 188DH9 | 280902 080741 | 60.80 | NO1 |
| Nice | 233EB9 | 070909 181107 | 54.20 | JK1 |
| Toulon | 1234756apm13 | 070909 181107 | 54.20 | QR1 |
| Toulon | 1234756RCS13 | 070909 181107 | 54.20 | ST1 |
| Nice | 017EB9 | 070909 073817 | 29.6 | CD1 |
| Toulon | 1234756apm13 | 030909 085540 | 40.00 | QR1 |
| Toulon | 1234756RCS13 | 030909 085540 | 40.00 | ST1 |

FIG.3B

| Record | Date | Time | V1 | V2 | V3 | State 1 | State 2 | V | Loc1 | Loc2 |
|---|---|---|---|---|---|---|---|---|---|---|
| 1, | 31/08/2009, | 12:43:35, | 283.0, | 444.0, | 450.7, | 01011000, | 00000000, | 0, | 1931.643,N, | 09909.819,W |
| 2, | 31/08/2009, | 12:45:05, | 283.0, | 444.0, | 450.7, | 00011000, | 00000000, | 0, | 1931.644,N, | 09909.819,W |
| 3, | 31/08/2009, | 12:46:35, | 283.0, | 444.0, | 450.7, | 00010000, | 00000000, | 0, | 1931.644,N, | 09909.819,W |
| 4, | 31/08/2009, | 12:48:05, | 283.0, | 444.0, | 450.7, | 00011000, | 00000000, | 0, | 1931.641,N, | 09909.819,W |
| 5, | 31/08/2009, | 12:49:35, | 283.0, | 444.0, | 450.7, | 00010000, | 00000000, | 0, | 1931.640,N, | 09909.819,W |
| 6, | 31/08/2009, | 12:51:05, | 283.0, | 444.0, | 450.7, | 01010000, | 00000000, | 0, | 1931.639,N, | 09909.818,W |
| 7, | 31/08/2009, | 12:52:35, | 283.0, | 444.0, | 450.7, | 01000000, | 00000000, | 0, | 1931.641,N, | 09909.818,W |
| 8, | 31/08/2009, | 12:54:05, | 283.0, | 444.0, | 450.7, | 01000000, | 00000000, | 0, | 1931.641,N, | 09909.818,W |
| 9, | 31/08/2009, | 12:55:35, | 283.0, | 444.0, | 450.7, | 01000000, | 00000000, | 0, | 1931.641,N, | 09909.818,W |
| 10, | 31/08/2009, | 12:57:05, | 271.0, | 444.0, | 450.7, | 01000000, | 00000000, | 0, | 1931.641,N, | 09909.818,W |
| 11, | 31/08/2009, | 12:58:35, | 256.0, | 444.0, | 450.7, | 01000000, | 00000000, | 0, | 1931.641,N, | 09909.818,W |
| 12, | 31/08/2009, | 13:00:05, | 244.0, | 444.0, | 450.7, | 01000000, | 00000000, | 0, | 1931.641,N, | 09909.818,W |
| 13, | 31/08/2009, | 13:01:35, | 244.0, | 444.0, | 450.7, | 01000000, | 00000000, | 0, | 1931.641,N, | 09909.818,W |
| 14, | 31/08/2009, | 13:03:05, | 244.0, | 444.0, | 450.7, | 01000000, | 00000000, | 0, | 1931.641,N, | 09909.818,W |
| 15, | 31/08/2009, | 13:04:35, | 244.0, | 444.0, | 450.7, | 01000000, | 00000000, | 0, | 1931.641,N, | 09909.818,W |

FIG.4A

| Point | Sensor signal | Quantity of fuel (liters) |
|---|---|---|
| 11 | 25906 | 200.0 |
| 12 | 25667 | 220.0 |
| 13 | 25105 | 240.0 |
| 14 | 24227 | 260.0 |
| 15 | 23618 | 280.0 |
| 16 | 23214 | 300.0 |
| 17 | 22618 | 320.0 |
| 18 | 21818 | 340.0 |
| 19 | 20862 | 360.0 |
| 20 | 19792 | 389.0 |

| Site | Licence plate | Cons l/100km | Cons l/h | Liters consumed | Distance traveled | % ERVM to total time | PM | End PM | Upstream Teq $CO_2$ | Combustion Teq $CO_2$ |
|---|---|---|---|---|---|---|---|---|---|---|
| Driver: (3) | | | | | | | | | | |
| Toulon | 741452D | 17.51 | 2.75 | 110.00 | 628.28 | 25.00% | 275909 2305 | 15709 1706 | 0.00 T | 0.20T |
| Marseille | 188DH9 | 100.20 | | 34.60 | 34.53 | .00% | 215409 1609 | 22009 0009 | 0.00 T | 0.10 T |
| Nice | 017EB9 | 12.98 | | 250.20 | 1927.20 | .00% | 295809 1907 | 74409 0509 | 0.10 T | 0.50 T |
| Total | | 43.56 | 2.75 | 394.80 | 2590.01 | 8.33% | | | 0.10 T | 0.80 T |
| Driver: BC1 (1) | | | | | | | | | | |
| Nice | 017EB9 | 3.87 | | 11.40 | 294.99 | .00% | 42909 1609 | 65009 1609 | 0.00 T | 0.00 T |
| Total | | 3.87 | | 11.40 | 294.99 | .00% | | | 0.00T | 0.00T |
| Driver : CD1 (1) | | | | | | | | | | |
| Nice | 017EB9 | 62.06 | | 446.10 | 718.80 | .00% | 74509 0509 | 94509 1109 | 0.10 T | 1.00 T |
| Total | | 62.06 | | 446.10 | 718.80 | .00% | | | 0.10T | 1.00T |
| Driver : COD2 (1) | | | | | | | | | | |
| Marseille | 188DH9 | 37.96 | | 358.50 | 944.46 | .00% | 224509 0509 | 235009 1609 | 0.10 T | 0.80 T |
| Total | | 37.96 | | 358.50 | 944.46 | .00% | | | 0.10 T | 0.80 T |

ELECTRONIC MONITORING SYSTEM ENABLING THE CALCULATION OF ACTUAL FUEL CONSUMPTION AND $CO_2$ EMISSIONS FOR A MOVING, STOPPED OR OPERATIONAL AIRCRAFT, WITH OR WITHOUT FUEL THEFT EXCLUSION

BACKGROUND OF THE INVENTION

The present invention relates to the general field of electronic monitoring systems comprising both a sentinel onboard a machine that itself includes at least an engine, a tank, and an electrical power supply circuit, and also a non-mobile surveillance tool to which the onboard sentinel is suitable for being connected by wire or wireless means. To be more precise, the invention relates to electronic monitoring systems aiming to track the consumption of fuel by the engine of the machine on which the sentinel is installed.

Tracking fuel consumption is at present particularly crucial whether from an economic point of view or an environmental point of view.

Thus the invention is primarily concerned with road transport of goods. This field of activity annually consumes tens of billions of liters of diesel and the contribution of the cost of fuel to the cost of road transport is continually increasing. It is thus found that controlling this expenditure item is at present very important to ensure the cost effectiveness of road transport businesses.

The fields of construction and public works, through their use of diverse plant and generator sets, are also of relevance because they also entail high fuel consumption.

There exists at present software for optimizing fuel consumption. The software is mainly employed in a surveillance tool that is not placed on the vehicle itself. There also exists software intended to be installed on the vehicle itself.

Those software tools generally provide for the entry or capture of data about the fuelling of a vehicle and about the distances covered in order to calculate average fuel consumptions.

Such software enables consumption to be tracked so as to carry out a first analysis of how drivers drive in order to compare the consumption of vehicles and the consumption associated with how drivers drive.

That software already enables drivers to be made aware of the impact of their driving on consumption in order to encourage them to adopt a more economical way of driving.

Nevertheless, that fuel consumption tracking software provides only an average consumption per vehicle without providing access to more precise data about fuel consumption.

There also exist onboard sentinels that are adapted to be connected to the tachograph of a vehicle, to its GPS receiver, and to the controller area network (CAN) bus of the vehicle on which the sentinel is installed. Such a sentinel is able to send fuel consumption data by wire or wireless connection means, for example via a cable or a modem, to processing software managed by the operator of the fleet of vehicles concerned.

The consumption data can then be determined a posteriori or in real time by the processing software. This can lead to decision-making as a function of the observed data.

Using the tachograph provides the speed of the vehicle and the time and date at which data is collected. The GPS receiver provides access to geolocation data. The CAN bus provides access to data from the electronic system onboard the vehicle.

As it happens, conventionally the only electronic data circulating on the CAN bus that enables tracking of the fuel consumption of the engine of the vehicle is data from a flow meter in the pipe feeding fuel to the combustion chamber or from an equivalent system measuring the quantity of fuel going to the combustion chamber.

At present, in vehicle onboard electronics, only the volume of fuel consumed is accessible via this device.

Such an electronic monitoring system enables the fuel consumption of a vehicle to be tracked correctly.

Nevertheless, it can now be seen that such systems are showing their limitations. In particular, that software is found to be unable to deal with new driver behaviors or the methods user by organised crime to carry out fuel theft, fuel substitution, and other violations.

Above all, known electronic monitoring systems are unable to provide information about the location of the violation or its date and time. They are unable to distinguish a theft from other events that may occur at the same geographical position.

Nor do they provide even indirect access to the identity of the person who carried out the offence or how that person carried it out.

OBJECT AND SUMMARY OF THE INVENTION

The principal object of the present invention is to alleviate the observed inadequacies of known electronic monitoring systems by proposing an electronic monitoring system enabling real fuel consumption and $CO_2$ emissions to be calculated for a machine in motion or stopped, with optional exclusion of thefts of fuel, the system comprising both a sentinel onboard a machine that itself includes at least an engine, a tank, and an electrical power supply circuit, and also a non-mobile surveillance tool to which the onboard sentinel is suitable for being connected by wire or wireless means, wherein:

- the onboard sentinel comprises:
  - at least one connector for connection to at least one dedicated fuel level sensor capable of producing quantitative measurements of the fuel level between a top wall and a bottom wall of the tank and for reception by the sentinel of fuel level data coming from this sensor, the dedicated sensor being calibrated before the electronic system enters service so that each output value of the sensor is associated on a one-to-one basis with a position of the fuel level between the top wall and the bottom wall of the tank and a precise volume of fuel remaining in the tank whatever the fuel level between the top wall and the bottom wall;
  - at least one clock suitable for providing time and date data;
  - at least one receiver for receiving geolocation data; and
  - at least one memory for storing successive rows of data comprising the fuel level data, the time and date data, and the geolocation data at a given time, with a periodicity in the range 1 second(s) to 240 s;
- the onboard sentinel is adapted to be powered by the electrical power supply circuit of the machine when the machine is operating and to be powered when the machine is not operating by an independent battery suitable for being charged while the machine is operating;
- the onboard sentinel further comprises a data processor module that is capable of detecting a drop in fuel level at constant geographical position from successive stored rows of data and, if a drop in fuel level is detected at constant geographical position, i.e. for a machine that is stopped, that is capable of communicating an alert to the surveillance tool in real time or in deferred time when the sentinel is connected to the surveillance tool, the data processor module also being suitable for communicating rows of data to the surveillance tool;

the surveillance tool is suitable for connection to the onboard sentinel by wire or wireless means and comprises at least a memory for storing the alerts and the rows of data communicated by the onboard sentinel, a data processor unit, and a screen for displaying the alerts and the data communicated by the onboard sentinel;

the sentinel further comprises means for detecting the operating or non-operating state of the engine of the machine, the engine operating state data being included in the row of data to be processed by the data processor module in such a manner as to include the operating state data of the engine in the alert communicated to the surveillance tool; and the surveillance tool thus determines the times with the engine running with the machine stopped and the times with the engine running with the machine in motion.

In the context of the invention, the expression "machine stopped" means that the machine has zero speed. With such a monitoring system using fuel level telemetry, the onboard sentinel periodically has access to a quantitative measurement of the real fuel level in the tank by means of the presence of a quantitative fuel level sensor placed in the tank. In so far as this fuel level data is coupled continuously and in real time with the geolocation data and the time and date data in the same data rows, the invention enables real-time monitoring of fuel tanks.

According to the invention, this fuel-level sensor is calibrated beforehand to effect quantitative measurements of fuel level between a top wall and a bottom wall of the tank. The invention is such that the dedicated sensor is calibrated before the electronic system enters service so that each output value of the sensor is associated on a one-to-one basis with a position of the fuel level between the top wall and the bottom wall of the tank and a precise volume of fuel remaining in the tank regardless of the fuel level between the top wall and the bottom wall. This characteristic is not available with the gauges usually installed in tanks. Known gauges are generally tubular or lever gauges measuring the level in steps from 18 millimeters (mm) to 21 mm high. What is more, known gauges enable quantitative measurement of the level over only 80% of the height of the tank excluding the top portion.

Note that at present the fuel gauges as used in vehicles and sending their measurement data over the CAN bus of the vehicles are not calibrated in such a manner as to enable fuel level to be measured quantitatively. Rather they provide an indicative measurement enabling only tracking of the decrease in fuel level from the moment at which there remains only some given quantity of fuel, starting from which the gauge begins to show a decrease. Known fuel gauges generally remain for some time at the maximum level after the tank has been filled before the gauge begins to indicate a progressive decrease in fuel level. The aim of this indication is to prevent the user running out of fuel and not to track the decreasing fuel level in real time.

The invention requires the installation of a new interface between a gauge and the sentinel of the invention to effect quantitative calibration of the gauge, regardless of whether it is dedicated to implementing the invention or else is a gauge previously installed for some other, notably indicative, purpose.

The invention thus proposes using quantitative data from the fuel-level sensor in combination with geolocation and time and date data, which data is stored together at a given time with a given periodicity. This data is known within the onboard sentinel of the invention, whatever the operating state of the machine on which the sentinel is installed.

The power supply system of the onboard sentinel uses either a connection to the electrical power supply circuit of the machine, or else a connection to an independent battery that is charged while the machine is operating. This ensures that data is strictly always stored at the same periodicity whatever the state of the machine, including with the machine stopped.

This characteristic is unknown in present-day electronic monitoring systems because there is never provision for data to be stored when the machine on which all or part of the electronic monitoring system is installed is not operating.

Combining control of the electrical power supply to the onboard sentinel with storage of data specific to the invention at a specific periodicity enables strict tracking of what is happening in the tank. The invention thus enables the data processor module to be used to detect a drop in fuel level at constant geographical position from successively stored rows of data, regardless of the operating state of the machine.

A continuous supply of power to the onboard sentinel is essential for such detection, which would otherwise be unreliable, or would risk missing events.

Note therefore that, apart from being able to access the known consumption per driver or per vehicle, as is already made possible in part by known prior art devices, the invention continuously and permanently provides information about the occurrence of a drop in fuel level at constant geographical position with known date, place and volume of fuel corresponding to the drop in fuel level.

The invention also provides complete control over whether or not there is any need to fill vehicles up before they set out from a logistics center having its own fuel store. The invention provides real-time access to information about the volume of fuel present in the tanks. This saves time because it enables trucks that are certain to have sufficient fuel to set off, thereby reducing queuing for refueling. It is common to observe queues of several hours when trucks leave certain road haulage businesses in the morning. Eliminating this necessarily achieves an economic saving.

None of the known devices provides real-time access to the real fuel level in one or more tanks. In known devices, the consumption of the vehicle is known based only on data relating to the quantity of fuel going to the combustion chamber, for example using a flow meter. Thus only an approximation can be given as a function of the average consumption since the last time the tank was full.

More generally, the invention provides knowledge about the real consumption of vehicles by deducting drops in fuel level at constant geographical position that can only correspond to fuel being siphoned from the tank. As it happens, this makes it possible to deduct thefts of fuel from the real consumption calculation and thus from the environmental impact of a business concerning emissions of $CO_2$, which is the main greenhouse-effect gas, which emissions are directly linked to the real consumption of fuel.

The invention enables the number of lifers that have been lost for whatever reason to be identified, and thus enables the financial loss to be calculated resulting from liters of fuel paid for but not consumed by the vehicles of the business.

The invention makes it possible to eliminate events that occur with the engine running and the machine stopped from the drops in fuel at constant geographic position. If the system were not able to determine the operating state of the engine, it would not be able to distinguish theft from normal consumption with the engine running when the vehicle is stopped. Thus the invention enables falling fuel level events and their nature to be determined in very fine manner. It must be emphasized here that the engine running state is different from the position of the ignition key. The ignition key may be in an "ON" position although the engine is not running. No fuel consumption would be observed under such circumstances. Here the invention is concerned with the engine when running.

Note finally that the characteristic whereby an alert is supplied to the surveillance tool to which the onboard sentinel may be connected may take diverse forms, ranging from a simple report to an alert in the full sense, in sound or visual form, in real time or in deferred time. With a deferred alert, notably if the sentinel must be connected to the surveillance tool to supply it with the data, the data processing advantageously carried out in the sentinel could be effected within the surveillance tool, in a degraded mode, after reception of the rows of data.

By means of the time and date data, the invention provides exactly the date and the time at which siphoning was effected. The drop in fuel level at constant geographical position clearly reveals siphoning from the tank. The geolocation data additionally gives the position of the vehicle at the time of the theft. The data indicating the operating state of the engine enables theft events proper to be eliminated from events with the engine on and the machine stopped.

The data indicating that the engine is running, in situations where, over and above the disappearance of fuel, the rate of the disappearance of fuel indicates the presence of a theft, further strengthens the proof of the guilt of the driver responsible for the vehicle at the time of the drop in fuel level. It also enables unproductive consumption to be identified, such as vehicles stopped with the engine running.

An additional advantage of having access to the operating state of the engine is the possibility of accessing the times for which the engine is running with the machine stopped and, directly associated therewith, the place, the date and the time at which this occurred. Thus the invention provides not only access to the length of time for which the engine was left running with the vehicle stopped, but also the times at which this event started and finished. Thus an elapsed time between two precise times is known from the time and date data. It is not a question of calculating an excessive average consumption using a kilometer count interrogated between two points, or of making a comparison with theoretical consumption using data from the CAN bus of the machine. Data from the CAN bus could nevertheless be compared with data obtained, by means of the invention. The same applies to the data from other instruments such as the tachograph, which could in parallel deliver the distance traveled, the time worked, the amount of rest time, speeds, and the driver. Radio frequency identification (RFID) type solutions could also be used.

The sentinel could in particular itself be connected to the above instruments. It would then be possible to feed in information available from those instruments with no intermediate sentinel and to cross-reference all this information.

With the invention, the times for which the engine is running with the machine stopped are known precisely and located in time and space. This applies whether or not the machine is operating. The distinction between these two types of drop in fuel level when stopped is data that is of very great value because it avoids erroneously accusing a driver of theft, and conversely it avoids missing the opportunity to point out behavior that is unsuitable in the light of fuel economy.

This also enables correction of the behavior of a particular driver who tends to leave the engine running, thus generating not only costs for the business but also $CO_2$ emissions that it is desirable to reduce, all the more so in that businesses are nowadays particularly inclined to supply environmental performance data that shows them in a good light.

Thus the invention assists road haulage businesses to reduce their fuel consumption and thus also to reduce fuel costs in their accounts as well as monitoring theft of fuel. Businesses are then also in a position to sign up to charters representing a voluntary commitment to the environment.

In particular, in France, the "Objectif $CO_2$: les transporteurs s'engagent, . . . " charter could be signed up to by businesses that nave acquired the monitoring system of the invention in order to add value to their commitments internally and externally.

The monitoring system of the invention precisely and efficiently measures consumption and real $CO_2$ emissions, optionally excluding theft of fuel, as a function of the information that is desired and while identifying unproductive consumption such as vehicle stopped with the engine running, which may be reduced by driver education.

Because of the recurrent nature of the stored measurements of fuel levels in combination with geolocation, date and time, and engine operating state data, the invention is able to deliver $CO_2$ emission calculations per geographical area over precise periods, or per client of the hauler, or per vehicle, and/or per driver.

Cross-referencing information about vehicle location and movement of the vehicle with the engine running thus enables optimum tracking of driver behavior and fuel consumption. This information thus indicates areas where improvements may be made and action taken.

Moreover, insofar as the onboard sentinel functions regardless of the operating state of the machine on which it is installed, the surveillance tool has access to engine stopped times, engine running times with the machine stopped, and engine running times with the machine moving. Thus the invention can provide a measurement of the total consumption over the journeys effected. This enables actions to be targeted with the objective of a quantified and realistic reduction based on accurate knowledge of the consumption per vehicle and/or per driver that defines a starting point.

Of course, the onboard sentinel of the invention can further provide access to details of the distance traveled, display of the route on digital maps, and vehicle stops.

In particular embodiments of the invention, the means for detecting the operating state of the engine are chosen from a connection to a sensor placed at the excitation terminal of an alternator of the electrical power supply circuit of the machine, a connection to a connector on the bodywork providing the engine running information, a connection to the battery to measure the voltage difference across the terminals of the main battery, the data processor module knowing beforehand the voltage difference observed between the voltage observed with an ON position of the ignition key and the voltage observed with the engine running.

These various means for determining the operating state of the engine give a reliable result indicating whether the engine is running and consuming fuel or is stopped and therefore no longer consuming fuel.

According to an advantageous characteristic of the invention, the data processor module of the sentinel is capable, from successive stored rows of data, of detecting a rise in fuel level at constant geographical position characteristic of topping up the tank and, if a rise in fuel level at constant geographical position is detected, of communicating in real time or in deferred time a dedicated signal to the surveillance tool to report the topping up.

This characteristic makes it possible, from a set of rows of data, to identify the times at which the tank was filled or topped up. This characteristic can also indicate the location, date and time of each filling up or topping up of the tank, possibly with display on a map.

This characteristic enables the user of the surveillance tool to obtain the dates and times of topping up the tank and the quantity actually put into the tank.

This characteristic is useful not only for identifying filling up and topping up in time but also to confirm substitution of fuel as is sometimes observed.

A drop in fuel level at a constant geographical position followed by a rise in that level at constant geographical position, whether that be at the same position or at a position different from that of the previously-observed drop in fuel level, or possibly the other way round, is entirely characteristic of a substitution of fuel.

According to one particular characteristic of the invention, the surveillance tool further comprises a data entry interface enabling a user to enter external data relating to topping up the tank, the data processor unit being adapted to receive this entered external data to detect inconsistencies between the external data entered by the user and the signals specific to topping up as communicated by the onboard sentinel.

In combination with the preceding characteristic, this characteristic enables detection of theft from the fuel store. Such thefts are carried out, for example, by filling a jerry can before, during or after filling the tank of the vehicle on which the onboard sentinel of the electronic monitoring system of the invention is installed.

By comparing the rise in fuel level observed and detected within the onboard sentinel and reported by the dedicated signal sent to the surveillance tool with the data captured by the surveillance tool and reporting the quantity of fuel paid for, generally stated on the receipt supplied by the service station in which the tank was filled, on the same date and at approximately the same time, the surveillance tool has access to the quantity of fuel that was then put into a container other than the tank of the machine on which the onboard sentinel of the electronic system of the invention is installed.

It is thus clear that, over and above the place and the date, the electronic monitoring system of the invention can determine how the missing fuel was misappropriated. If a drop in fuel level at constant geographical position is observed, it is a question of siphoning, and if comparing the quantity of fuel paid for on a tank filling receipt with the quantity of fuel measured when the fuel level rises should reveal an inconsistency, it is a theft from the filling station that is detected.

Thus by means of this surveillance tool it is also possible to determine where, when and how a thief has set about stealing fuel.

According to an advantageous characteristic of the invention, the periodicity of storing rows of data is in the range 60 s to 120 s.

This periodicity achieves a rough compromise between the fluctuations in the fuel level that it is possible to detect in the tank and sufficiently refined sampling of the level in the tank to enable detection of a drop in fuel level at constant geographical position, which is what the invention is aimed at. Fluctuations in the tank may notably be caused by acceleration and deceleration of the vehicle.

According to a preferred characteristic of the invention, the storage periodicity is in the range 85 s to 95 s.

The inventors have noted that a time interval of around 90 s is the optimum for eliminating the effects of fluctuations in level caused by acceleration and deceleration of the vehicle and that taking measurements every minute and a half in this way enables very reliable tracking of driver behavior.

This enables the electronic monitoring system of the invention to provide an optimum amount of data, neither too little nor too much, for tracking the real consumption by the vehicle, and that is reliable and sufficiently precise, given the level of fuel in a tank observed by the surveillance tool.

Taking measurements in this way with a chosen period of around 90 s avoids having to average the fuel level if a fluctuation caused by acceleration or deceleration is observed.

It is observed with sampling with a period of less than 60 s that it is necessary to average the level reported by the sensor to avoid detecting certain drops in fuel level at constant geographical position or to detect false drops in fuel level at constant geographical position.

Calculating such an average level mobilizes calculation resources within the processing means. It may be desirable to avoid this for reasons of economy or of speed calculation.

Thus optimizing the periodicity of storing the rows of data is particularly important in the context of the invention and a chosen value of around 90 s proves particularly suitable.

According to an advantageous characteristic, the sentinel further comprises a connector to be connected to at least one ignition key position detector and the data from this detector is included in the row of data and is processed by the data processor module in such a manner as to include the ignition key position data in the alert communicated to the surveillance tool.

This characteristic can determine whether the driver remained in the vicinity of the vehicle when a drop in fuel level was detected. If a vehicle is stolen, the persons carrying out the theft generally take precautions so as to be able to depart easily and without wasting time. It is thus generally found that the ignition key generally remains in the "ON" position or even that the engine continues to run during thefts by siphoning from the tanks of vehicles. The rate at which fuel disappears with the engine running then enables the theft to be distinguished from simple consumption when stopped with the engine running.

The presence of this ignition key position data enables the operator where the surveillance tool is installed to obtain additional proof to characterize the theft of fuel and most importantly to identify the person responsible, because the ignition key is generally handed over to a particular driver at the start of a run and returned at the end of the run. If the ignition key were left in the "ON" position during the drop in level in the tank at constant geographical position, the driver in question would find it difficult to assert that they were not responsible for or were unaware of this larceny.

According to a particular characteristic of the invention, the sentinel comprises a module for calibrating the fuel level sensor selected from ultrasound sensors and sensors using a float, calibration taking place before the electronic system enters into service and automatically associating on a one-to-one basis an output value of the sensor with each fuel level position between the top wall and the bottom wall of the tank and thus with a precise volume of fuel remaining in the tank.

This characteristic enables each observed level of fuel in the tank to be associated with an output value of the sensor, thereby automatically procuring the quantitative character of the measurements effected by the fuel level sensor. The use of such an automatic calibration module is beneficial, but manual calibration can also be carried out on each type of tank to associate a remaining volume of fuel with an output value of the sensor.

According to an advantageous characteristic, the data processor unit of the surveillance tool is adapted to calculate a real consumption of the machine from the stored rows of data.

According to another advantageous characteristic of the electronic system of the invention, the data processor unit of the surveillance tool is adapted to calculate the carbon dioxide emission of the machine.

This calculation can provide direct access to the carbon balance of the activity carried out by the machine, which may contribute to a commercially viable approach to clients increasingly sensitive to environmental questions. It can also contribute to giving a modern environmentally-friendly corporate image within a perspective of sustained growth. Overall, the image of road haulage could be improved.

According to an advantageous characteristic of the invention, for the machine having a working function ancillary to the operation of its engine, the sentinel comprises means for determining the operating state of this ancillary working function, the operating state data for the ancillary working function being included in the row of data, the surveillance tool thus determining times with the engine running with the machine stopped and working and times with the engine running with the machine stopped and not working.

This data about the operating state of a working function can dissociate productive engine-running and machine-stopped times, i.e. times with the engine running with the machine stopped but doing work, from unproductive engine-running and machine-stopped times, i.e. times when no work is being done. For some particular actions, specialist vehicles must have the engine running to carry out the working function. Times with the engine running but the machine stopped must then not be included in unproductive consumption. This characteristic can distinguish between these two situations. Over a period of several hours in which the engine has continued to run with the machine stopped, this characteristic makes it possible to identify times in which, typically, a power take-off was active to carry out the ancillary working function (pump, crane, etc.). This time is excluded from unproductive consumption.

The invention also provides a sentinel for installation on a machine that itself comprises at least one tank, an engine, and an electrical power supply circuit, and suitable for being connected by wire or wireless means to a non-mobile surveillance tool to produce an electronic system according to any preceding claim, the sentinel comprising:

- at least one connector for connection to at least one dedicated fuel level sensor capable of producing quantitative measurements of the fuel level between a top wall and a bottom wall of the tank and for reception by the sentinel of fuel level data coming from this sensor, the dedicated sensor being calibrated before the electronic system enters service so that each output value of the sensor is associated on a one-to-one basis with a position of the fuel level between the top wall and the bottom wall of the tank and with a precise volume of fuel remaining in the tank whatever the fuel level between the top wall and the bottom wall;
  - at least one clock suitable for providing time and date data;
  - at least one receiver for receiving geolocation data; and
  - at least one memory for storing successive rows of data, each comprising the fuel level data, the time and date data, and the geolocation data at a given time, with a periodicity in the range 1 s to 240 s;
- the onboard sentinel is adapted to be powered by the electrical power supply circuit of the machine when the machine is operating and to be powered, when the machine is not operating, by an independent battery suitable for being charged while the machine is operating;
- the onboard sentinel further comprises a data processor module that is capable of detecting a drop in fuel level at constant geographical position from successive stored rows of data and, if a drop in fuel level is detected at constant geographical position, i.e. for a machine that is stopped, that is capable of communicating an alert to the surveillance tool in real time or in deferred time when the sentinel is connected to the surveillance tool, the data processor module also being suitable for communicating rows of data to the surveillance tool;
- the sentinel further comprises means for detecting the operating or non-operating state of the engine of the machine, the engine operating state data being included in the row of data to be processed by the data processor module in such a manner as to include the operating state data of the engine in the alert communicated to the surveillance tool.

Such a sentinel may be connected to a surveillance tool as required and enable use of the invention within the machine of which the electronic system of the invention is intended to monitor consumption.

The invention further provides a non-mobile surveillance tool suitable for being connected by wire or wireless means to an onboard sentinel of the invention, to produce an electronic system of the invention, and comprising at least one memory for storing the alerts and the rows of data communicated by the onboard sentinel from which it accesses times with the engine running when the machine is stopped and times with the engine running when the machine is in motion, and a screen for displaying the alerts and the data communicated by the onboard sentinel.

With regard to the above two devices of the invention, note here that the characteristics relating to them and stipulated above with reference to the electronic system as described in its entirety may characterize either or both of these devices.

The invention further provides a monitoring method to be implemented both in a sentinel onboard a machine, itself including at least an engine, a tank, and an electrical power supply circuit, and also in a non-mobile surveillance tool to which the onboard sentinel is suitable for being connected by wire or wireless means to produce an electronic system of the invention, the method comprising the following steps:

- in the onboard sentinel:
  - calibrating at least one dedicated sensor before the electronic system enters service so that each output value from the sensor is associated on a one-to-one basis with a position of the fuel level between the top wall and the bottom wall of the tank, and with a precise volume of fuel remaining in the tank whatever the fuel level between the top wall and the bottom wall;
  - a step of reading a clock;
  - a step of connecting the sentinel via at least one connector to the dedicated fuel level sensor capable of producing quantitative measurements of fuel level between a top wall, and a bottom wall of the tank and of the sentinel receiving fuel level data coming from this sensor;
  - a step of the sentinel receiving geolocation data;
  - a step of detecting the operating or non-operating state of the engine of the machine;
  - a step of storing in a memory of the sentinel successive rows of data comprising fuel level data, time and date data supplied by the clock of the sentinel, data from the operating or non-operating engine state sensor, and geolocation data at a given time with a periodicity in the range 1 s to 240 s;

a step of selecting a power supply on the basis of a criterion relating to operation of the electrical circuit of the machine, enabling the sentinel to be powered by the electrical power supply circuit of the machine while the machine is operating and, when the machine is not operating, to be powered by an independent battery suitable for being charged while the machine is operating;

a step performed in the sentinel of detecting a drop in fuel level at constant geographical position, i.e. for a machine that is stopped, by processing data from successive stored rows of data;

a step of the sentinel communicating an alert to the surveillance tool in real time or in deferred time when the sentinel is connected to the surveillance tool and a drop in level at constant geographical position has been detected;

a step of the sentinel communicating rows of data including engine operating state data to the surveillance tool;

in the surveillance tool:

a step of connecting to the onboard sentinel by wire or wireless means;

a step of storing in a memory of the surveillance tool alerts and rows of data communicated by the onboard sentinel;

a step of determining engine running times with the machine stopped and engine running times with the machine in motion; and a step of displaying alerts and data communicated by the onboard sentinel.

In a preferred implementation, the various steps of the method of the invention are determined by computer program instructions.

Consequently, the invention further provides a computer program on a data medium and suitable for being executed in a computer, this program comprising instructions adapted to execute the steps of the method of the invention.

This program may use any programming language and take the form of source code, object code, or a code intermediate between source code and object code, such as a partially-compiled form, or any other desirable form.

The invention further provides a computer-readable data medium containing instructions of a computer program as referred to above.

The data medium may be any entity or a device capable of storing the program. For example, the medium may comprise storage means, such as a read only memory (ROM), for example a compact disk (CD) ROM or a micro-electronic circuit ROM, or magnetic storage means, for example a floppy disk, a hard disk, a flash memory, a USB key, etc.

Moreover, the data medium may be a transmissible medium such as an electrical or optical signal, which can be conveyed via an electrical or optical cable, by radio or by other means. The program of the invention can in particular be downloaded over an Internet-type network.

Alternatively, the data medium may be an integrated circuit in which the program is incorporated, the circuit being adapted to execute the method in question or to be used in its execution.

BRIEF DESCRIPTION OF THE DRAWINGS

Other characteristics and advantages of the present invention emerge from the description given below with reference to the appended drawings, which show a non-limiting embodiment of the invention. In the figures:

FIGS. 3A and 3B respectively show an example of alert parameter settings for reporting a drop in fuel level at constant geographic position and a dedicated signal reporting topping up the tank at constant geographical position and an example of consumption alert display;

FIGS. 4A, 4B, 4C, and 4D show tables and graphs in which abnormal excess consumption events are detected;

DETAILED DESCRIPTION OF ONE EMBODIMENT

Figures 1, 2:
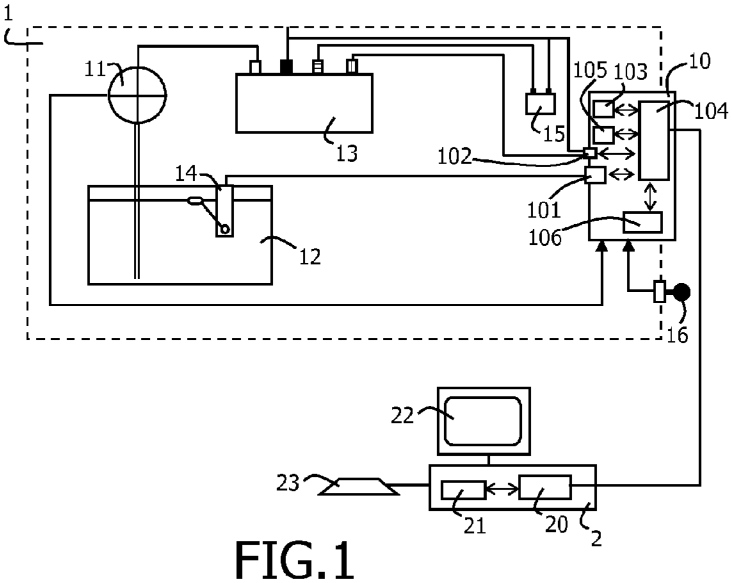
FIG. 1 shows diagrammatically an electronic monitoring system of the invention.
FIG. 2 shows an example of successive rows of data stored in the onboard sentinel and downloaded into the surveillance tool before being displayed thereon in the manner shown in this figure.

FIG. 1 shows diagrammatically an electronic monitoring system of the invention. This system comprises a sentinel 10 onboard a machine that itself includes at least an engine 11, a tank 12, and an electrical power supply circuit.

This electrical power supply circuit conventionally comprises a battery 13 and various means for connecting to the engine 11, notably to recover energy generated thereby by means of an alternator. The battery 13 is generally also connected to a plurality of sensors generally present onboard the machine 1, either directly or via the sentinel 10.

Thus the battery 13 is connected to the sentinel 10, itself connected to a fuel level sensor 14 able to make quantitative measurements of the fuel level in the tank 12 between the top wall and the bottom wall of that tank 12.

The sensor 14 is also connected to the sentinel 10 in such a manner that it is able to send it fuel level data that it is in a position to acquire. To this end, the sentinel 10 comprises a connector 101. This connector for transmitting data advantageously also provides the power supply connection to the sensor 14 via the sentinel 10.

According to the invention, the sentinel 10 further comprises a switchable power supply connector 102 capable of switching the power supply of the sentinel 10 between the electrical power supply circuit of the machine 1 and therefore direct supply of power by the battery 13 and an ancillary and independent power supply circuit based on the provision of an auxiliary battery 15. The battery 15 is advantageously connected to the sentinel 10, itself connected to the main battery 13. Accordingly, this auxiliary battery 15 can be charged from the electrical power supply circuit of the machine 1 when the engine 11 is running and can supply electrical energy to the sentinel 10 as soon as the electrical power supply circuit of the machine 1 is switched off.

The sentinel 10 further comprises a data processor module 104, a clock 103 suitable for supplying time and date data to the data processor module 104, a receiver 105 for receiving geolocation data, and a memory 106.

The memory 106 is notably used by the invention to store successive rows of data comprising fuel level data from the sensor 14, time and date data from the clock 103, and geolocation data from the receiver 105 at a given time with a periodicity in the range 1 to 240 s.

According to the invention, the periodicity for storing rows of data is advantageously in the range 60 to 120 s to eliminate the fastest oscillations of the fuel level in the tank 12. The periodicity of 120 s provides sufficient sampling of the fuel level to identify the acts that the monitoring system of the invention is intended to detect.

To be more precise, the optimum periodicity range that optimizes the quantity of data stored, that eliminates oscillations in the tank, and that detects the required events is in the range 85 to 95 s.

The sentinel 10 of the system may advantageously be installed inside the dashboard.

The electronic monitoring system of the invention also comprises a surveillance tool 2 provided with a memory 20 for storing alerts and rows of data communicated by the onboard sentinel 10, a data processor unit 21, and a screen 22 for displaying alerts and data communicated by the onboard sentinel 10.

The surveillance tool advantageously further comprises a data entry interface 23 enabling the user to enter external data relating to topping up the tank 12.

FIG. 2 shows several rows of data as stored with a periodicity of 90 s during the operation of a vehicle that is being tracked by the monitoring system of the invention.

The message transferred by the sentinel to the surveillance tool has the following format:

ymmddnnn,ddmmaaaa,hhmmss,xxxx.x,yyyy.y,zzzz.z, ABCD EFrr,IJKLMOPr,sss.s,ddmm.mmm,S, dddmm.mmm,W,cc.cccc,tt.t,t t.t,tt.t The above format is interpreted as follows:

| | |
|---|---|
| Vehicle identification - serial number: | ymmddnnn; |
| Date: | ddmmaaaa; |
| Time: | hhmmss; |
| Liters R1: | xxxx.x; |
| Liters R2: | yyyy.y; |
| Liters R3: | zzzz.z; |
| State 1: | ABCDEFrr; |
| State 2: | IJKLMOPr; |
| Speed NM/hr: | sss.s; |
| Latitude: | ddmm.mmm; |
| Latitude: | S; |
| Longitude: | dddmm.mmm; |
| Longitude; | W; |
| Client interface (for example EcoG): | cc.cccc; |
| Temperature 1: | +/− tt.t; |
| Temperature 2: | +/− tt.t; |
| Temperature 3: | +/− tt.t |

The speed at which this data is sent may be programmed at 4800, 9600, or 19200 bauds.

There may be added to the above frame all the information supplied by the CAN bus, the tachograph of the vehicle, and at least one RFID module.

The geolocation data denoted Loc1 and Loc2 in this table shows that the vehicle was moving between 21:06 and 21:27. The fuel level decreases logically with the movement of the vehicle. Nevertheless, it should be noted here that the observation of this decrease is conditioned by the sensitivity of the sensor 14 placed in the tank 12.

Note also that the surveillance tool has access to the states of sensors providing information about the operation of the engine and the position of the ignition key. Other states available by means of other sensors installed on the vehicle could also be included in rows of data of the type shown in FIG. 2. Here State 1 indicates that the ignition key is in the ON position (second row of State 1: 0=ignition ON) and that the engine of the vehicle is running (fourth row of State 1: 1–engine running). FIGS. 3A and 3B respectively show the parameter settings for the excess consumption alert threshold and the tank topping up detection threshold. An alert is given if these thresholds are exceeded at constant geographical position. To effect this detection, the data processor module compares the fuel level observed on two or more successive rows with the maximum flows with parameters set in the sentinel, as shown in FIG. 3A.

As shown in FIG. 3, maximum flows are advantageously indicated for various operating states of the engine and states of movement of the vehicle. Choosing parameter settings for excess consumption matched to the average consumption of the vehicle avoids triggering false alarms and enables excess consumption to be detected selectively.

The invention provides for the data processor module to effect various level comparisons, in particular comparisons between two rows of data stored at the beginning and at the end of a constant geographical position.

FIG. 3B shows a plurality of excess consumptions detected as displayed on the screen of the surveillance tool. Each of the excess consumptions observed is associated with a site (Marseilles, Toulon, Nice) operating a plurality of vehicles identified by their license plates. The alert was sent beforehand to the surveillance tool 2 by the sentinels 10 installed on the vehicles concerned.

The surveillance tool 20 then displays the excess consumption in the format shown in FIG. 3B, which shows the operating site, the license plate of the vehicle concerned, the date and time at which the abnormal excess consumption was observed, the volume of the decrease observed and the code of the driver who was at the wheel of the vehicle carrying the license plate concerned at the relevant time.

Thus it is possible to track with great refinement any theft of fuel from a given vehicle and to specify the time at which the theft was perpetrated and the place, which is not specified here but is known in the rows of data as communicated to the surveillance tool. It is also possible to dissociate a theft from excess consumption caused by the engine running while the machine is stopped.

Until now, if has not been possible to detect such theft and to give its characteristics, because using a flow meter or measuring the quantity of fuel fed to the engine to measure consumption provides no way of detecting the date and the time of a theft.

In known devices, although it is possible to determine the fuel consumption at any time, it is not possible to track in real time the quantity of fuel in the tank of the vehicle, and this prevents detection of theft by siphoning.

FIGS. 4A, 4B, 4C, and 4D show examples of, respectively, rows of data in which a theft is detected, a curve of the fuel level at constant geographical position showing theft by siphoning, an alert as displayed on the surveillance tool, and a curve tracking fuel level with movement of the vehicle and on which suspect events appear.

In FIG. 4A, it is seen that the truck effects a small movement, visible in the geolocation data, before stopping in data row (or record) 7. Then, according to records 9 to 12, the volume V1 in the tank was reduced by 41 liters without the vehicle moving. This typically indicates siphoning, the quantity missing as a function of time stopped being greater than the consumption of an engine running with the vehicle stopped.

Moreover, apart from problems of theft, note that, because access is available to the state of the ignition key and the engine at the same time as to geolocation data, it is possible to detect excess consumption caused by the driver leaving the engine running when stopped. It is even possible to give a result in the form: the vehicle was stopped for 20% of the overall operating time of its engine.

Figure 4B:
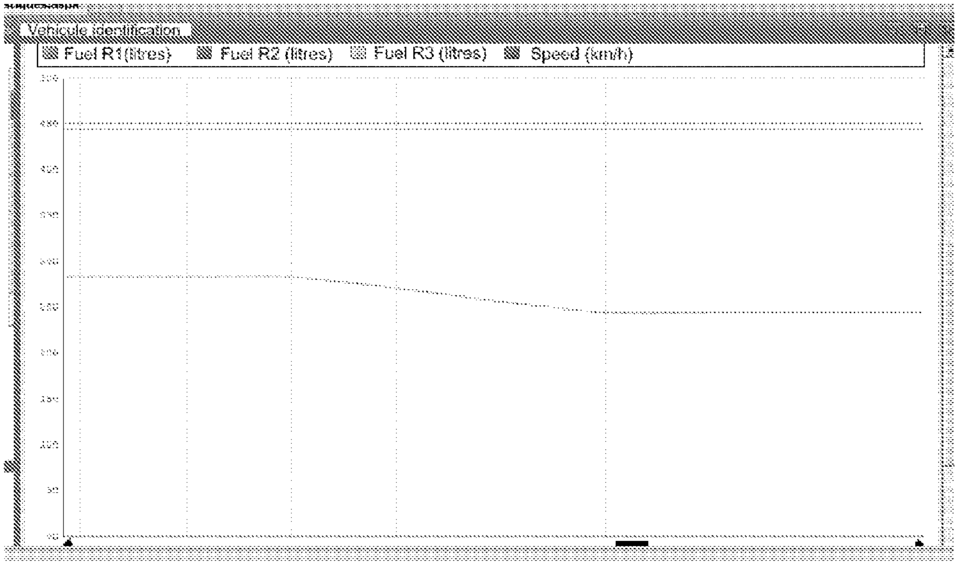

As shown in FIG. 4B, the surveillance tool is able to calculate and display a curve of fuel level as a function of the successive records. The FIG. 4B curve shows in graph form the theft detected in the FIG. 4A table.

Figure 4C:
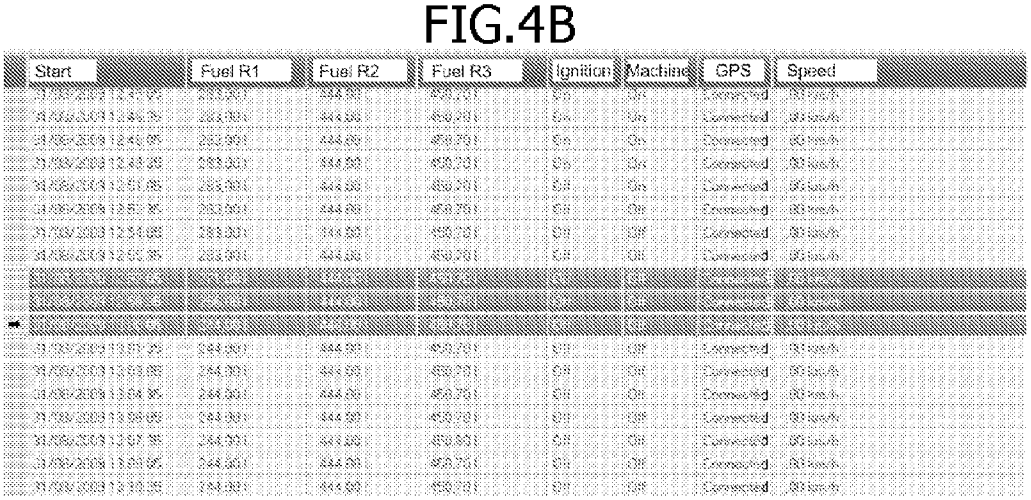

FIG. 4C shows an example of displaying the "theft" alert associated with the theft visible in the FIG. 4A data table. The surveillance tool could also display the locations of the events observed on a map. It can also provide all kinds of consumption statistics over shorter or longer time periods.

Figure 4D:
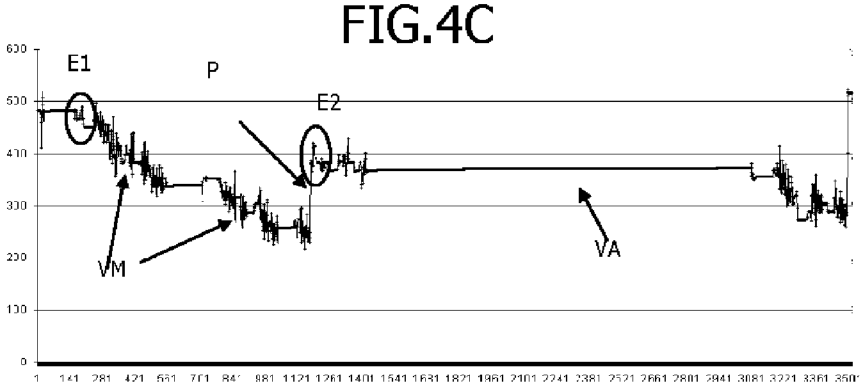

FIG. 4D shows an example of a fuel level curve on which suspect events are detected. Thus it is seen, via correlation with the geolocation data, that zones VM of the curve correspond to the vehicle in motion. There is also seen here a zone VA in which the vehicle is stopped. Also seen are two suspect events E1 and E2 where the fuel level fell rapidly. Theft is detected if, from the geolocation data, the vehicle is found to be stopped at the times corresponding to these records.

Figures 5, 6:
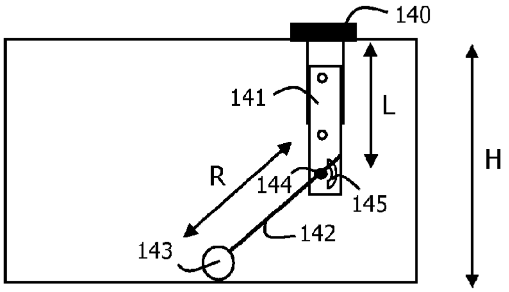
FIG. 5 shows an example of sensors using a float suitable for use in the invention.
FIG. 6 shows a table of the results of calibrating the fuel level sensor of the invention.

FIG. 5 shows a float-type sensor 14 that the invention may use. Note here that other types of sensor, for example ultrasound sensors, could be used to implement the invention provided that a quantitative measurement of the fuel level between the top wall of the tank 12 and its bottom wall can be acquired. There also exist tubular-type sensors in which the float is wound around an axis of the sensor and that could be used in the system of the invention.

The sensor 14 shown in FIG. 5 presents a disk 140 for fastening it to the tank, a longitudinal body 141 designed to be placed vertically in the tank and advantageously of adjustable length so as to adapt to various tank sizes, and a lever arm 142 provided at its end with a float 143. The lever arm 142 is hinged about an axis 144 placed at the bottom end of the body 141 of the sensor 14. In the example shown, the height L of the body 141 of the sensor may be adjusted using screws placed in holes provided for this purpose along the body 141.

The length R of the lever arm 142 of the float 143 may also be modified as a function of the location at which the float 143 and the fastening axis 144 are fastened to on the body of the sensor.

Thus installing the sensor comprises two steps. The first consists in adjusting the length L of the body 141 so that it is equal so 50% of the diameter H of the tank if it is cylindrical or 50% of the height H of the tank if it is of a square or rectangular block-shape. The position of the float 143 on the lever arm 142 is then adjusted in such a manner that when the arm 142 of the float 143 is in the full tank position, the top wall of the float 143 is at the height of the top wall of the tank.

Furthermore, if such a sensor is used, it is necessary for the float 143 to touch the bottom wall of the tank 12 in the bottom position of the float 143, i.e. in the lowermost rotation position.

For the purposes of the invention it is also necessary for the high rotational position to be quantitative for the highest possible fuel levels in the tank 12. For this the float 143 must float at all times and never be wedged against the top wall. The float and the various elements of the sensor are sized to this end, although a margin of error at the top and bottom of the tank may be acceptable. However, the shape of the tank and the position of the filling hole are ideally such that the float 143 cannot be pressed against the top wall.

As shown in FIG. 5 and described above, the height L of the body 141 of the sensor between the top wall of the tank 12 and the hinge axis 144 of the lever arm 142 and the length R of the lever arm 142 are in reality chosen as a function of the height H of the tank 12.

Thus adjustable-arm fuel level sensors may be used within the tanks of machines on which the invention is used.

FIG. 6 is a table listing an example of calibration points associating the output signal SC of the sensor 14 and the quantity of fuel present in the tank 12. Such a table may be the result of manual or automatic calibration.

The advantage of manual calibration is its accuracy and reliability, because the quantity of fuel introduced into the tank 12 is completely under control. Thus an output signal SC of the sensor 14 may be very exactly associated with the quantity of fuel present in the tank.

To perform manual calibration, it is necessary for the tank to be drained beforehand and disconnected from any other tanks that might be present on the machine concerned. The absence of connections between tanks during calibration prevents fuel making its way from other tanks to the tank being calibrated or vice-versa. It is always necessary for the onboard sentinel 10 to be connected to its power source and for the sensor to be connected to the sentinel 10.

The float 143 must of course be installed correctly in the tank 12 and unobstructed movement of the lever arm 142 of the float 143 must be possible over the full height of the tank 12.

Finally, it is necessary for the tank 12 that is to be calibrated to be clearly identified in the sentinel 10. The maximum capacity of the tank concerned should also advantageously be indicated to the sentinel 10.

Note here that calibration may be carried out via the user interface present on the surveillance tool. This is an advantageous embodiment. Nevertheless, an ancillary device could also be used to carry out this operation.

Such an ancillary device or the surveillance tool is in any event suitable for programming the sentinel 10, indicating the identifiers of the tanks connected, their maximum capacities, and their positions.

Manual calibration of the tank is necessary for the monitoring system to give the maximum accuracy in reading the fuel levels in the tank.

This operation is begun with the tank empty and it is necessary to stop several times to capture the signal at the output of the level sensor and add a new row of data to the calibration files as a function of the quantity of fuel that has been introduced into the tank.

A file is then generated that defines the float and the tank precisely in addition to the calibration points that associate the signal from the sensor with the quantity of fuel.

Such a file of the type shown in FIG. 6 is then used for subsequent installations in vehicles having similar float configurations and tank sizes.

The invention provides for calibrating the tank automatically. It is then a question of downloading a calibration file from an ancillary device or preferably from the surveillance tool. The calibration file is then identified by data corresponding to the size and to the volume of the tank. Such a calibration file is typically a file produced by previous manual calibration of a tank identical to that for which the calibration file has been downloaded.

However, this calibration will not be strictly matched to the particular tank concerned and may generate errors in the quantitative measurements of fuel level. Manual calibration will then be essential.

At the start of the manual calibration operation, it is therefore necessary to ensure that the tank is indeed empty. If not, excess consumption and fill-ups below the fuel level then observed will not be detected or will be falsified. It is also necessary to wait until the output signal from the sensor has stabilized.

The tank may then be $1/16^{th}$ filled, for example. Thus for a tank of 1200 liters (L), 75 L of fuel should be placed in the tank. The output signal SC of the sensor is then captured and a data point added to the calibration file. It is of course necessary to wait for the output signal of the sensor to stabilize before it is captured. This may take a minute or slightly more after finishing adding the fuel to the tank.

Another point is then produced for the tank $1/8^{th}$ ($2/16^{th}$) full. This operation is carried out until the tank is full.

In the example given, the tank is filled $1/16^{th}$ at a time. However, dividing the volume of the tank into fractions ranging from $1/12^{th}$ to $1/20^{th}$ may be envisaged to ensure reliable calibration of the monitoring system. Intermediate values are then calculated automatically by the sentinel 10, typically by linear approximation.

With the FIG. 5 sensor, the position of the float 143 corresponds to an analog resistance measurement produced by a potentiometer or ohmmeter 145 placed under the path of the lever arm 142 in the vicinity of the axis 144 of the sensor. The value of the resistance of the potentiometer 145 then varies as a function of the position of the lever arm 142 as a result of the float 143 floating on the fuel surface.

The position of the float is then typically identified as a function of the output value from the potentiometer 145 over a number of positions of the order of one hundred, and preferably around 65 positions.

The sensors used with the system advantageously have a resistance that may vary between two extreme values, known beforehand, for the tank full and the tank empty.

These extreme resistance values correspond to the extreme positions of the float 143 for a full tank and an empty tank, respectively. For example, these values range from 33 ohms (Ω) to 245Ω or from 0Ω to 180.33Ω, where 0Ω and 33Ω correspond to the tank empty or the tank full and 245Ω and 180Ω correspond to the tank full or the tank empty.

These resistance values of the float 143 correspond to digital values in the range 19,700 to 48,700, respectively for a full tank and for an empty tank.

The invention thus uses a voltage at the output of the level sensor 14. This voltage varies as a function of the resistance that itself varies as a function of the fuel level and, with the FIG. 5 type sensor, the position of the float. The voltage constitutes analog data that is converted into digital data that is advantageously an index of rank that runs from 0 to 65,535, for example.

During manual calibration, in each calibration step, the digital index is associated with a total volume in liters present in the tank. Thus an analog value, namely a voltage, at the output of the sensor is converted into a digital value that is associated with a "liters in tank" value.

The number of rows of the calibration file is at least equal to 10 and preferably lies in the range 16 to 20. Typically, if the maximum capacity of the tank is 460 liters and a file of 20 rows if required, it will be necessary to fill the tank with about 23 L at a time.

The tank liters between two consecutive calibration points are calculated automatically pro rata. For a tank 60 centimeters (cm) high with a capacity of 600 L, a calibration file of 20 rows enables real calibration of the tank fuel level every 3 cm from 0 cm to 60 cm. Note here that for a slab-type tank of 600 L, each 3 cm corresponds to 30 L of fuel. The intermediate positions are calculated pro rata.

In FIG. 6, 20-liter portions are used to produce the calibration file.

Note here that if an original gauge previously installed on a tank is used to implement the invention, previous manual calibration is necessary in the manner described above. A dedicated interface is advantageously used in such circumstances.

Figures 7, 8:
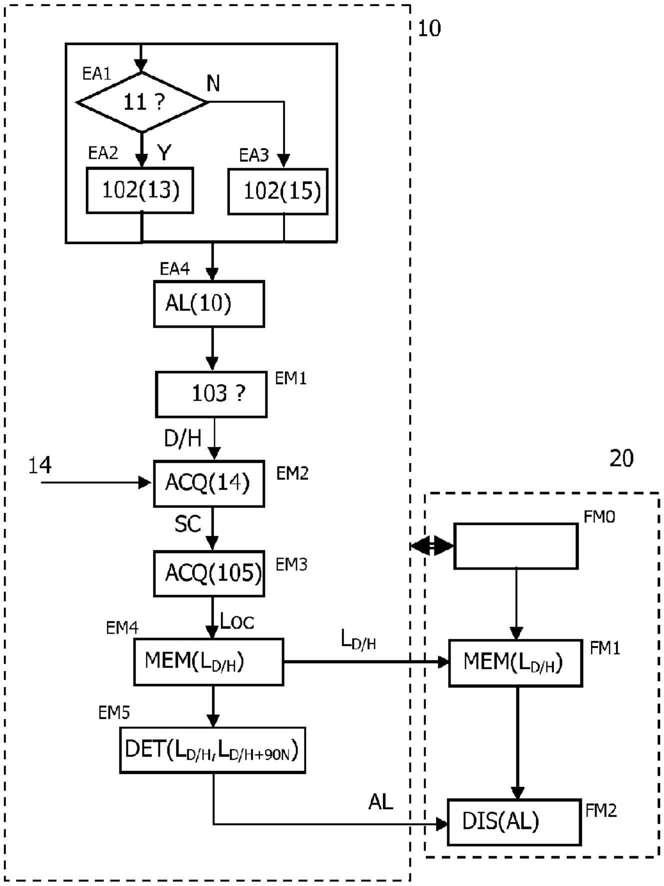
FIG. 7 is a flowchart of the method of the invention.
FIG. 8 shows a sheet that it is possible to draw up within the surveillance tool for managing a fleet of vehicles or a group of drivers.

FIG. 7 is a flow chart of the method of the invention. This method is implemented mainly in the sentinel 10 but also partly in the surveillance tool 20.

Firstly, the sentinel 10 is powered continuously by a certain number of looped steps enabling continuous powering of the sentinel 10 either by the battery 13 or by the battery 15, as function of the state of the engine 11.

Thus, in FIG. 7, in the step EA1, the operation of the engine 11 is examined. If the engine 11 is operating the battery 13 is powered up. The battery 13 is then selected by the switchable connector 102, in a step EA2, to power the sentinel 10 in a step EA4.

If the engine 11 is not operating, in a step EA3, the battery 15 is selected by the switchable connector 102 to power the sentinel 10 in a step EA4.

Note here that the operation of the engine 11 is examined to enable the switchable connector 102 to select one of the two power supply modes. Nevertheless, using a sensor for the position of the ignition key instead of a sensor for operation of the engine 11 is entirely feasible, typically a voltage sensor placed on the alternator excitation terminal. Generally speaking, when the ignition key is in the "ON" position, the electrical power supply circuit is powered up and is thus suitable for powering the sentinel 10.

The method of the invention then interrogates the clock 103, in a step EM1, to find out the appropriate sampling time at which the data constituting a row of data will be captured at the chosen and pre-programmed periodicity, here 90 s.

The date and time D/H are then used to associate, in a step EM2, acquisition at the appropriate time of the output signal SC of the sensor 14. Finally, in a step EM3, the geolocation data Loc at the date and time D/H is acquired from the geolocation receiver 105.

Then, in a step EM4, the set of data Loc, SC, D/H is stored in the memory in the form of a row $L_{D/H}$. The memory in the onboard sentinel 10 advantageously has a capacity of around 20,000 rows, for example 24,000 rows, which corresponds to approximately 20 consecutive days.

The successive rows $L_{D/H}$ and $L_{D/H+90N}$ for N in the range from 1 to a predefined number, for example 10, are then examined in a step EM5 to detect a drop or an increase in fuel level at constant geographical position.

If a drop in fuel level at constant geographical position is observed in the step EM5, an alarm AL is then sent to the surveillance tool 20, which receives it, stores it, and advantageously proceeds to display this alert AL in a step FM2.

In parallel with this, the surveillance tool 2 is connected or connects itself to the sentinel 10 in a step FM0. Then, in a step FM1, the rows $L_{D/H}$ are transferred deferred or in real time to the surveillance tool 20, where they are stored in a memory.

The surveillance tool 20 produces various tables of results of the type shown in FIG. 8. In that table are shown the characteristics of the consumption observed for a number of vehicles operated on different sites and driven by different drivers. Note here that the identity of the driver who drove the vehicle on which the sentinel 10 is installed is generally an external item of data acquired by the surveillance tool 20 by data entry via the user interface 23. This also applies to other data relating to operation of the vehicles, in particular an activity area, for example for the purposes of "geofencing".

Regarding the identity of the driver, the information may be recovered by the onboard system when it is connected to the tachograph of the vehicle.

Where geofencing is concerned, provided that it is installed beforehand by the user, the data can be detected automatically in real time by the onboard system. For example, the device may check automatically if the GPS position at the time of detecting a fill-up corresponds to the location or a fuel pump. This corresponds to a combination of information.

This kind of management information system enables consumption to be tracked in a more or less detailed manner as a function of the driver, of the operating site, or of the vehicle.

It is then possible to establish consumption averages and also to establish statistics on the environmental impact of the operation, notably by calculating the real $CO_2$ emissions resulting from the operation.

As mentioned above, the surveillance tool 20 advantageously comprises a user interface 23 for acquiring external data supplied by a user of the surveillance tool 20.

The surveillance tool 20 then typically and advantageously receives information about the quantity of fuel introduced into each tank, as a function of fuel bills.

By then comparing the quantity of fuel entered in this way with a corresponding fuel increase at the time and date of the fill-up corresponding to the invoice, the invention can compare the quantities of fuel automatically in the surveillance tool 20.

The surveillance tool 20 is then in a position to supply an alert automatically and independently to report an inconsistency between the two quantities, where appropriate. Theft from the tank will then be suspected.

Moreover, since the surveillance tool 20 has access to rows of data $L_{D/H}$ as received and stored in the surveillance tool, it is possible to carry out a number of calculations, including calculating ratios between times with the engine running and the vehicle stopped and times with the engine running and the vehicle in motion. These ratios provide access to a percentage of consumption that may be saved. However, the invention is able to indicate the place, date and time of excess consumption resulting from the engine running with the vehicle stopped. This enables correction of driver behavior and reduction of excess consumption as a result of the engine being left running when stationary.

It is also possible to carry out all kinds of statistical calculations, such as calculating average consumption per 100 kilometers (km), total consumption by volume, average consumption per hour with the engine running.

It is equally possible to exclude or to include stolen fuel, since the invention enables fuel thefts to be identified and quantified, to calculate the real cost of fuel in an operation, or to calculate the real impact of an operation in terms of carbon emissions.

Note here that the machine may have a working function ancillary to the operation of its engine requiring the engine to be running to activate it. The sentinel then comprises means for determining the operating state of this ancillary working function, the engine-running state data being included in the row of data to be processed by the data processor module. Times during which the working function is activated are then excluded from unproductive times with the engine running and the vehicle stopped. The operating state of the working function is typically determined from the activation or non-activation of a power take-off on the machine.

The surveillance tool 20 also enables data to be grouped together. For example, all vehicles operated on a site could be grouped to calculate an average consumption of the site and to be able to compare operation on various sites. Comparisons between trucks or between drivers may also be performed.

The surveillance tool 20 of the invention, in combination with the onboard sentinel 10 of the invention, thus enables reporting on the past history of an operation as well as reporting on the current operation, i.e. the operation in the present, since it makes possible to send alerts to the surveillance tool 20 in real time. The invention provides for the surveillance tool 20 to be connected wirelessly to the onboard sentinel 10, for example so that the sentinel 10 can transmit alerts AL in real time to the surveillance tool 20.

In contrast, it is also desirable to be able to connect the onboard sentinel 10 by cable to the surveillance tool 20 in order to transfer the rows of data. A cable connection is more suitable for the quantity of data then transferred from the sentinel 10 to the surveillance tool 20. An RS232 connection could be used, for example.

Furthermore, securing communication between the sentinel 10 and the surveillance tool 20 by means of a password may be envisaged.

Preprogramming the electronic monitoring system is also envisaged, so that it detects any manipulation of the onboard sentinel 10 aiming to prevent its operation: disconnection of a sensor, etc. A specific alarm, preferably sent in real time to the surveillance tool 20, is then advantageously associated with such detection. Such means for preventing pirating of onboard sentinels are known to the person skilled in the art and may be implemented within the electronic system of the invention.

The surveillance tool 20 is also advantageously able to display on its display device maps showing the route of the vehicle and the locations where the tank is topped up as well as, where appropriate, the locations at which a drop in fuel level is observed.

The invention provides a precise and detailed view of fuel consumption and thus enables irregular and unproductive consumption to be reduced. The invention therefore enables overall reduction of fuel consumption and strengthening of the cost-effectiveness and competitiveness of businesses. Moreover, the invention enables better overall management through the provision of various tracking management information systems.

As a result of the invention, road transport businesses may enter into formative initiatives and thus provide additional mobilization and motivation of all personnel.

What is claimed is:

1. An electronic monitoring system enabling real fuel consumption and $CO_2$ emissions to be calculated for a machine in motion or stopped, with optional exclusion of thefts of fuel, the system comprising:

1) a machine comprising:

(i) an engine;

(ii) a tank for storing fuel and comprising a top wall and a bottom wall;

(iii) a fuel level sensor capable of supplying fuel-level data comprising quantitative measurements of the level of fuel of the tank, the sensor being calibrated before the electronic system enters service so that each output value of the sensor is associated on a one-to-one basis with a position of the fuel level between the top wall and the bottom wall of the tank and a precise volume of fuel remaining in the tank;

(iv) an electrical power supply circuit; and (v) an independent battery configured to be charged while the machine is operating;

2) an onboard sentinel configured to be:

a) powered by electrical power supply circuit of the machine when the machine is operating;

b) powered by the independent battery when the machine is not operating;

c) connected to a non-mobile surveillance tool by wire or wireless means;

and wherein the sentinel comprises:

(i) at least one fuel-level sensor connector such that the sentinel may receive fuel level data supplied by the fuel level sensor;

(ii) at least one clock configured to supply time and date data;

(iii) at least one receiver for receiving geolocation data;

(iv) at least one memory for storing successive rows of data comprising the fuel level data, the time and date data, and the geolocation data at a given time, with a periodicity in the range 1 s to 240 s; and (v) a data processor module capable of:

(a) detecting a drop in fuel level at constant geographical position from successive stored rows of data;

(b) communicating an alert in real time or in deferred time if a drop in fuel level is detected at constant geographical position, i.e. for a machine that is stopped;

(c) communicating rows of data; and 3) the non-mobile surveillance tool comprising:

(i) a memory for storing alerts and rows of data sent by the data processor module of the sentinel;

(ii) a data processor unit;

(iii) a screen for displaying the alerts and the data communicated by the onboard sentinel; and (iv) means for detecting the operating or non-operating state of the engine of the machine, the engine operating state data being included in the row of data to be processed by the data processor module in such a manner as to include the operating state data of the engine in the alert communicated to the surveillance tool, such that the surveillance tool thus determines the times with the engine running with the machine stopped and the times with the engine running with the machine in motion.

2. An electronic monitoring system according to claim 1, wherein the means for detecting the operating state of the engine are chosen from:

(i) a connection to a sensor placed at the excitation terminal of an alternator of the electrical power supply circuit of the machine, (ii) a connection to a connector on the bodywork providing the engine running information, (iii) a connection to the electrical power supply circuit to measure the voltage difference across the terminals of the electrical power supply circuit, the data processor module being calibrated beforehand so as to distinguish between the voltage difference observed between an ON position of the ignition key and the voltage observed with the engine running.

3. An electronic system according to claim 1, wherein the data processor module of the sentinel is configured to detect, from successive stored rows of data, a rise in fuel level at constant geographical position characteristic of topping up the tank and, if a rise in fuel level at constant geographical position is detected, to communicate in real time or in deferred time a dedicated signal to the surveillance tool to report the topping up.

4. An electronic system according to claim 3, wherein the surveillance tool further comprises a data entry interface enabling a user to enter external data relating to topping up the tank, and wherein the data processor unit of the surveillance tool is further configured to receive this entered external data to detect inconsistencies between the external data entered by the user and the signals specific to topping up as communicated by the onboard sentinel.

5. An electronic system according to claim 1, wherein the periodicity of storing rows of data is in the range 60 s to 120 s.

6. An electronic system according to claim 5, wherein the periodicity is in the range 85 s to 95 s.

7. An electronic system according to claim 1, wherein the machine further comprises at least one ignition key position detector and the sentinel further comprises a connector to be connected to the ignition key position detector, and wherein the data processor module of the sentinel is configured to include the data from the ignition key position detector in the row of data and process the data in such a manner as to include the ignition key position data in the alert communicated to the surveillance tool.

8. An electronic system according to claim 1, wherein the fuel level sensor is either an ultrasound sensor or a sensor using a float, and the sentinel further comprises a module for calibrating the fuel level sensor, the calibration taking place before the electronic system enters into service and automatically associating on a one-to-one basis an output value of the sensor with each fuel level position between the top wall and the bottom wall of the tank and thus with a precise volume of fuel remaining in the tank.

9. An electronic system according to claim 1, wherein the data processor unit of the surveillance tool is configured to calculate a real fuel level consumption of the machine from the stored rows of data.

10. An electronic system according to claim 1, wherein the data processor unit of the surveillance tool is configured to calculate the carbon dioxide emission of the machine.

11. An electronic monitoring system according to claim 1, wherein, for the machine having a working function ancillary to the operation of its engine, the sentinel comprises means for determining the operating state of this ancillary working function, the operating state data for the ancillary working function being included in the row of data, the surveillance tool thus determining times with the engine running with the machine stopped and working and times with the engine running with the machine stopped and not working.

12. An electronic monitoring system according to claim 1, wherein the dedicated fuel level sensor comprises a longitudinal body intended to be placed vertically in the tank and of adjustable length so as to be able to adapt to various tank sizes, a lever arm provided at its end with a float, the lever arm being hinged about an axis placed at the bottom end of the body, the position of the float corresponding to an analog resistance measurement produced by a potentiometer or ohmmeter placed under the path of the lever arm in the vicinity of the axis of the sensor, the value of the resistance of the potentiometer being variable as a function of the position of the lever arm as a result of the float floating on the surface of the fuel, the position of the float then being identified as a function of the output value from the potentiometer between two extreme values, known beforehand, corresponding to the tank full and the tank empty, following calibration in which the output value of the potentiometer is associated with a total volume in liters present in the tank.

13. An electronic monitoring system according to claim 12, wherein the length of the lever arm may be modified as a function of the location at which the float is fastened and the location of the fastening axis on the body, wherein the fuel level sensor is installed in the tank by adjusting the length of its body so that it is equal to 50% of the height of the tank, by adjusting the position of the float on the lever arm in such a manner that, when the arm of the float is in the tank full position, the top wall of the float is at the height of the top wall of the tank and in such a manner that, for the bottom position of the float, i.e. the lowest rotation position of the arm, the float touches the bottom wall of the tank.

14. A sentinel for onboard installation on a machine, the machine comprising:

(i) an engine:

(ii) a tank for storing fuel and comprising a top wall and a bottom wall;

(iii) a fuel level sensor capable of supplying fuel-level data comprising quantitative measurements of the level of fuel of the tank, the sensor being calibrated before the electronic system enters service so that each output value of the sensor is associated on a one-to-one basis with a position of the fuel level between the top wall and the bottom wall of the tank and a precise volume of fuel remaining in the tank;

(iv) an electrical power supply circuit; and (v) an independent battery configured to be charged while the machine is operating;

wherein the sentinel is configured to be:

(a) powered by the electrical power supply circuit of the machine when the machine is operating;

(b) powered by the independent battery when the machine is not operating; and (c) connected to a non-mobile surveillance tool by wireless means; and wherein the sentinel comprises;

i) at least one fuel-level sensor connector such that the sentinel may receive fuel level data supplied by the fuel level sensor;

ii) at least one clock configured to supply time and date data;

iii) at least one receiver for receiving geolocation data;

iv) at least one memory for storing successive rows of data comprising the fuel level data, the time and date data, and the geolocation data at a given time, with a periodicity in the range 1 s to 240 s; and v) a data processor module capable of:

a) detecting a drop in fuel level at constant geographical position from successive stored rows of data;

b) communicating an alert in real time or in deferred time if a drop in fuel level is detected at constant geographical position, i.e. for a machine that is stopped; and c) communicating rows of data;

wherein the alert and the rows of data are communicated to the surveillance tool when the sentinel is connected to the surveillance tool.

15. A non-mobile surveillance tool configured to be connected by wire or wireless means to an onboard sentinel according to claim 14, and comprising:

i) at least one memory for storing alerts and rows of data sent by the data processor module of the onboard sentinel ii) a data processor unit;

iii) a screen for displaying the alerts and the data communicated by the onboard sentinel; and iv) means for detecting the operating or non-operating state of the engine of the machine, the engine operating state data being included in the row of data to be processed by the data processor module in such a manner as to include the operating state data of the engine in the alert communicated to the surveillance tool, such that the surveillance tool thus determines the times with the engine running with the machine stopped and the times with the engine running with the machine in motion.

16. A monitoring method to be implemented by an electronic monitoring system according to claim 1, the method comprising the steps of:

by the sentinel:

1) calibrating the fuel level sensor before the electronic system enters service so that each output value of the sensor is associated on a one-to-one basis with a position of the fuel level between the top wall and the bottom wall of the tank and a precise volume of fuel remaining in the tank;

2) reading the clock to obtain time and date data;

3) connecting the fuel level connector to the dedicated fuel level sensor of the machine, the fuel level sensor capable of supplying fuel-level data comprising quantitative measurements of the level of fuel of the tank of the machine 4) receiving geolocation data;

5) detecting the operating or non-operating state of the engine of the machine;

6) storing in its memory successive rows of data comprising the fuel level data, the time and date data, the operating state data, and geolocation data at a given time with a periodicity in the range 1 s to 240 s;

7) selecting a power supply depending on whether the electrical power supply circuit of the machine is in operation, such that the sentinel is powered by the electrical power supply circuit of the machine when the machine is operating and, when the machine is not operating, powered by an independent battery configured to be charged while the machine is operating;

8) detecting a drop in fuel level at constant geographical position, i.e. for a machine that is stopped, by processing data from successive stored rows of data;

9) communicating an alert to the surveillance tool in real time or in deferred time when the sentinel is connected to the surveillance tool and a drop in level at constant geographical position has been detected;

10) communicating rows of data including engine operating state data to the surveillance tool; and by the surveillance tool;

11) connecting to the onboard sentinel by wire or wireless means;

12) storing in its memory alerts and rows of data communicated by the onboard sentinel;

13) determining engine running times with the machine stopped and engine running times with the machine in motion; and 14) displaying alerts and data communicated by the onboard sentinel.

17. A microprocessor in an onboard sentinel of claim 1, comprising a computer program product including instructions for executing a method, comprising the steps of:

1) calibrating the fuel level sensor before the electronic system enters service so that each output value of the sensor is associated on a one-to-one basis with a position of the fuel level between the top wall and the bottom wall of the tank and a precise volume of fuel remaining in the tank:

2) reading the clock to obtain time and date data:

3) connecting the fuel level connector to the dedicated fuel level sensor of the machine, the fuel level sensor capable of supplying fuel-level data comprising quantitative measurements of the level of fuel of the tank of the machine 4) receiving geolocation data:

5) detecting the operating or non-operating state of the engine of the machine:

6) storing in its memory successive rows of data comprising the fuel level data, the time and date data, the operating state data, and geolocation data at a given time with a periodicity in the range 1 s to 240 s;

7) selecting a power supply depending on whether the electrical power supply circuit of the machine is in operation, such that the sentinel is powered by the electrical power supply circuit of the machine when the machine is operating and, when the machine is not operating, powered by an Independent battery configured to be charged while the machine is operating:

8) detecting a drop in fuel level at constant geographical position, i.e. for a machine that is stopped, by processing data from successive stored rows of data;

9) communicating an alert to the surveillance tool in real time or in deferred time when the sentinel is connected to the surveillance tool and a drop in level at constant geographical position has been detected;

10) communicating rows of data including engine operating state data to the surveillance tool; and by the surveillance tool:

11) connecting to the onboard sentinel by wire or wireless means;

12) storing in its memory alerts and rows of data communicated by the onboard sentinel;

13) determining engine running times with the machine stopped and engine running times with the machine in motion: and 14) displaying alerts and data communicated by the onboard sentinel.

18. A microprocessor in a surveillance tool of claim 1, comprising a computer program product including instructions for executing a method, comprising the steps of:

1) calibrating the fuel level sensor before the electronic system enters service so that each output value of the sensor is associated on a one-to-one basis with a position of the fuel level between the top wall and the bottom wall of the tank and a precise volume of fuel remaining in the tank:

2) reading the clock to obtain time and date data:

3) connecting the fuel level connector to the dedicated fuel level sensor of the machine, the fuel level sensor capable of supplying fuel-level data comprising quantitative measurements of the level of fuel of the tank of the machine 4) receiving geolocation data:

5) detecting the operating or non-operating state of the engine of the machine:

6) storing in its memory successive rows of data comprising the fuel level data, the time and date data, the operating state data, and geolocation data at a given time with a periodicity in the range 1 s to 240 s;

7) selecting a power supply depending on whether the electrical power supply circuit of the machine is in operation, such that the sentinel is powered by the electrical power supply circuit of the machine when the machine is operating and, when the machine is not operating, powered by an independent battery configured to be charged while the machine is operating:

8) detecting a drop in fuel level at constant geographical position, i.e. for a machine that is stopped, by processing data from successive stored rows of data;

9) communicating an alert to the surveillance tool in real time or in deferred time when the sentinel is connected to the surveillance tool and a drop in level at constant geographical position has been detected;

10) communicating rows of data including engine operating state data to the surveillance tool; and by the surveillance tool:

11) connecting to the onboard sentinel by wire or wireless means;

12) storing in its memory alerts and rows of data communicated by the onboard sentinel;

13) determining engine running times with the machine stopped and engine running times with the machine in motion: and 14) displaying alerts and data communicated by the onboard sentinel.

* * * * *